United States Patent [19]

Schmid

[11] Patent Number: 5,611,927
[45] Date of Patent: Mar. 18, 1997

[54] SYSTEM FOR REMOVING NUTRIENTS FROM WASTEWATER

[75] Inventor: Lawrence A. Schmid, Manhattan, Kans.

[73] Assignee: Waterlink, Inc., Canton, Ohio

[21] Appl. No.: 612,227

[22] Filed: Mar. 7, 1996

[51] Int. Cl.$^6$ ........................................ C02F 3/30
[52] U.S. Cl. ..................... 210/605; 210/623; 210/630; 210/903; 210/906
[58] Field of Search ..................... 210/605, 623, 210/626, 630, 903, 906

[56] References Cited

U.S. PATENT DOCUMENTS

| | | | |
|---|---|---|---|
| 4,655,925 | 4/1987 | Tabata et al. | 210/906 |
| 5,037,795 | 7/1991 | Schmid | 210/197 |
| 5,076,928 | 12/1991 | Ballnus | 210/605 |
| 5,137,636 | 8/1992 | Bundgaard | 210/605 |
| 5,196,111 | 3/1993 | Nicol et al. | 210/903 |
| 5,536,407 | 7/1996 | Petersen | 210/605 |

Primary Examiner—Christopher Upton
Attorney, Agent, or Firm—Hovey, Williams, Timmons & Collins

[57] ABSTRACT

A wastewater treatment system mixes return activated sludge with influent wastewater under anoxic conditions in the presence of luxury uptake organisms to cause release of phosphorous compounds into the surrounding wastewater. The wastewater is then aerated in the presence of nitrifying organisms to convert ammonia into nitrate while the luxury uptake organisms take up the phosphorous compounds. The wastewater is next subjected to alternating anoxic and oxic conditions to reduce the nitrate to nitrogen gas using denitrifying organisms. The resulting effluent is substantially free of nitrogen-based phosphorous-based nutrients.

18 Claims, 5 Drawing Sheets

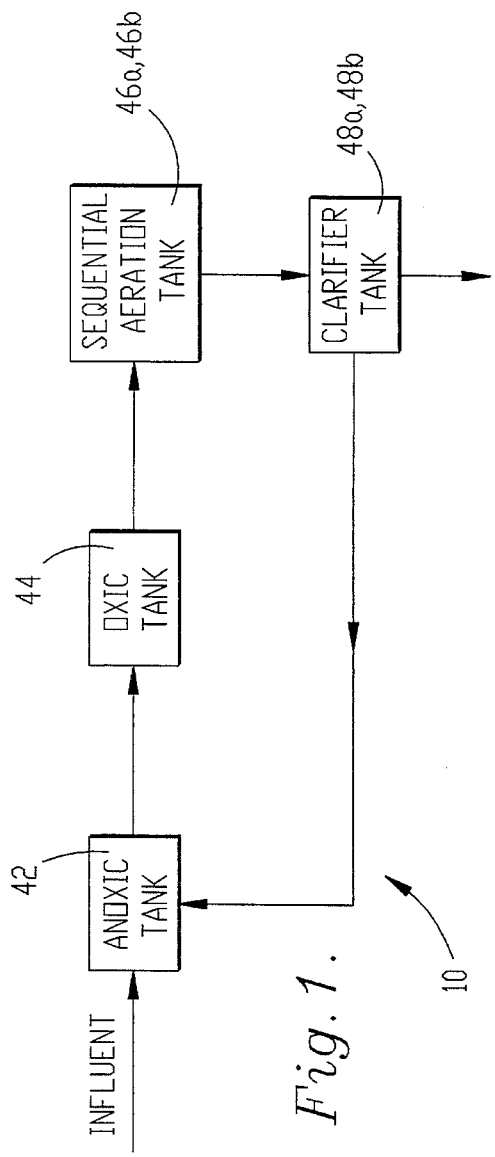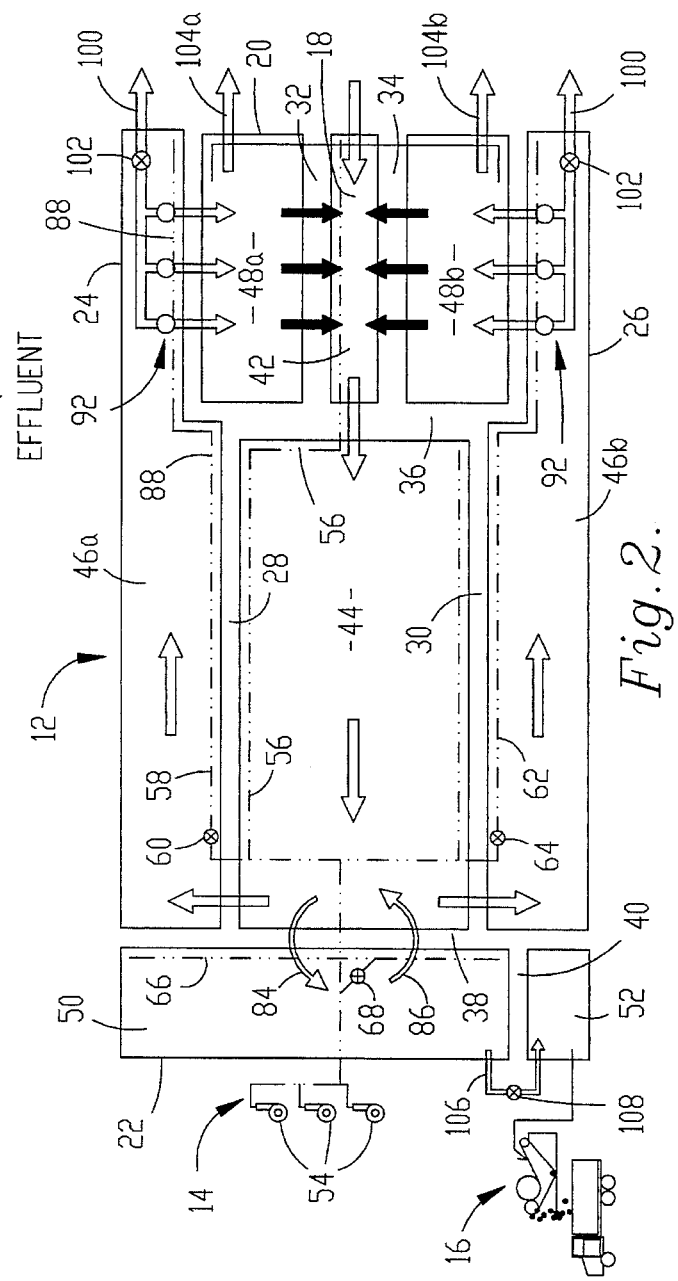

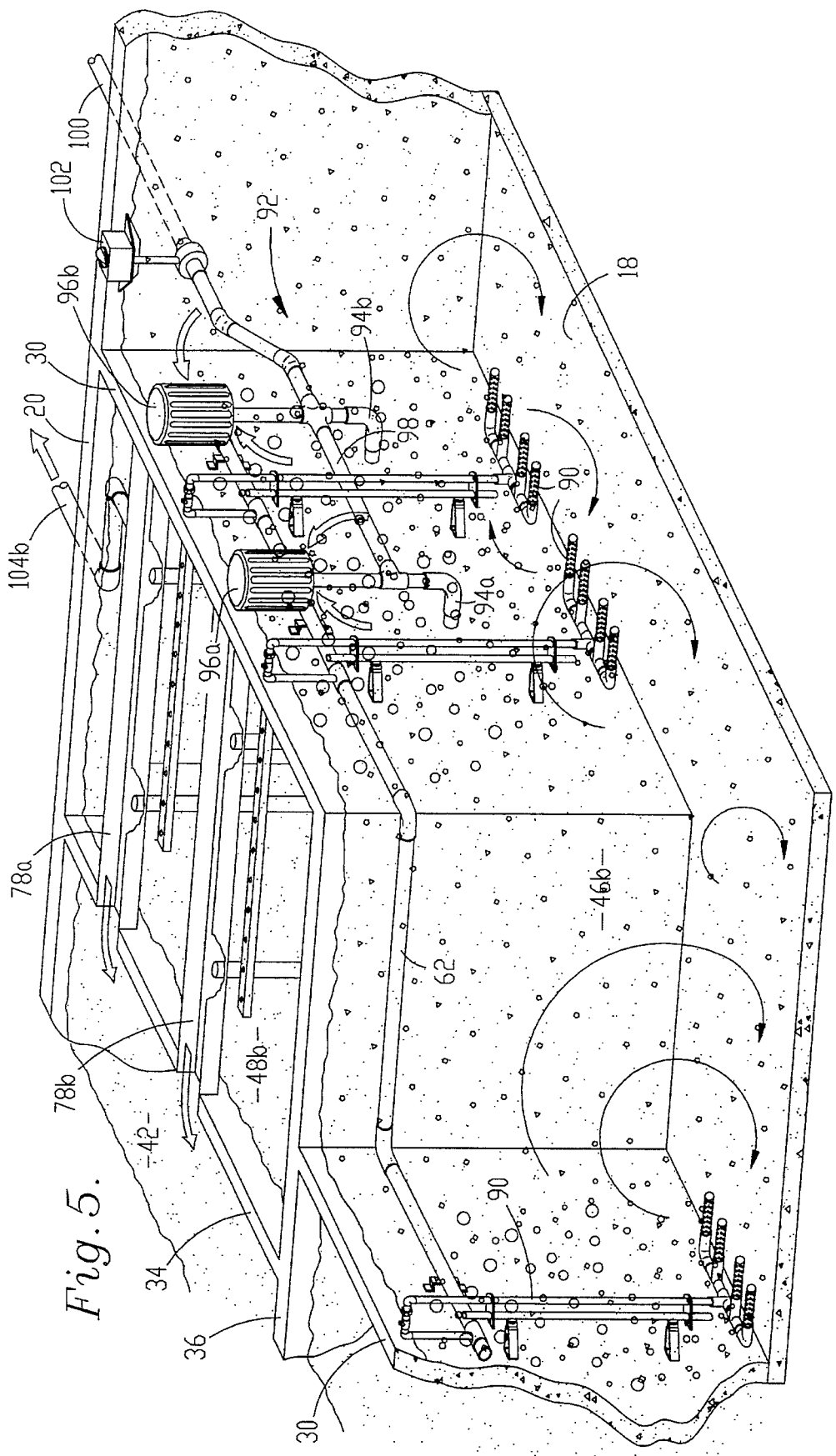

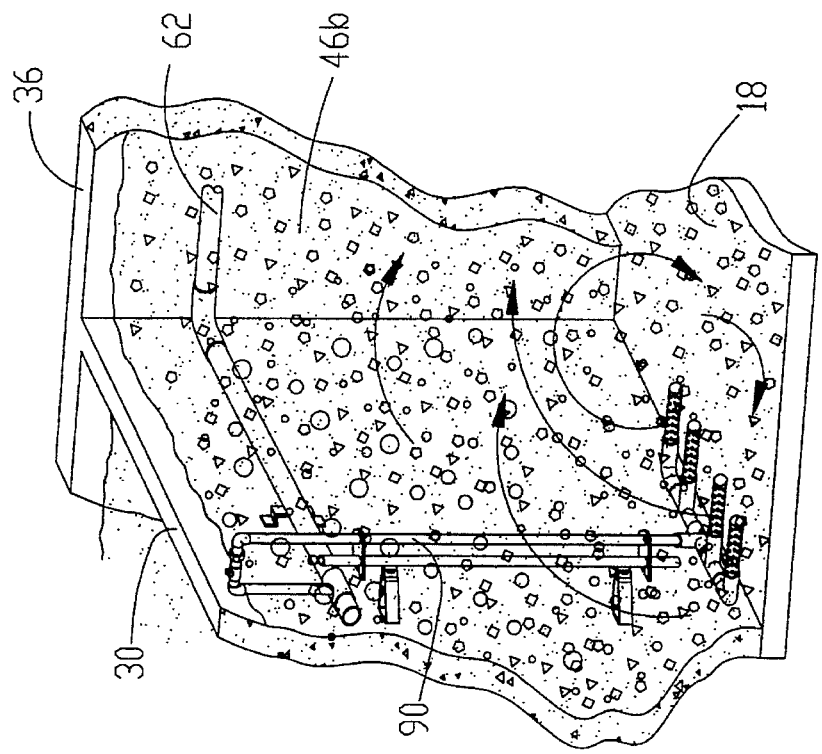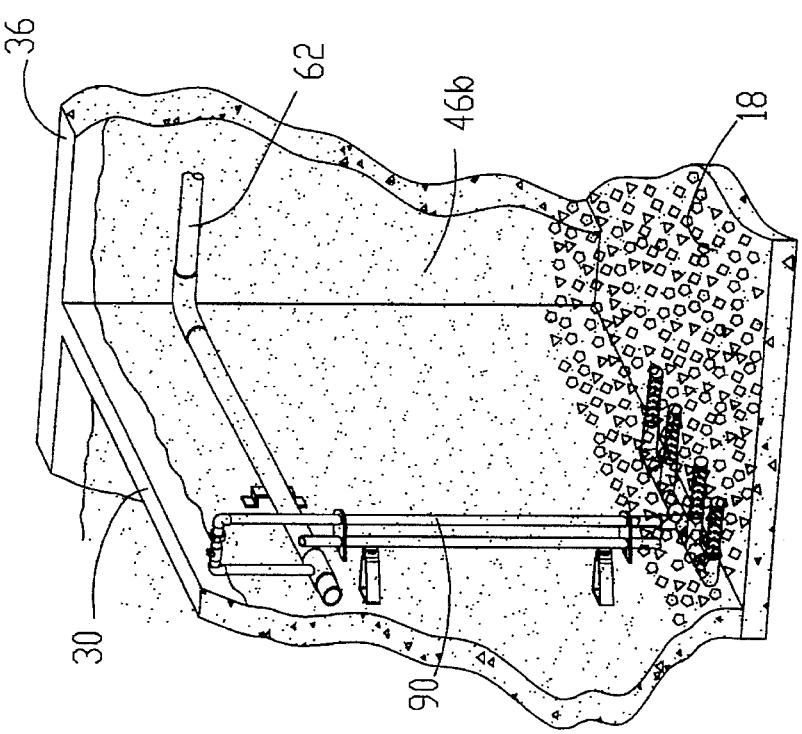

SYSTEM FOR REMOVING NUTRIENTS FROM WASTEWATER

BACKGROUND OF THE INVENTION

1. Field of the Invention

The present invention relates to the field of wastewater treatment. More particularly, the invention is concerned with a process for reducing nitrogen-based and phosphorous-based nutrients in wastewater treatment effluent.

2. Description of the Prior Art

The design focus of prior art wastewater treatment plants has been to oxidize biosolids as measured by biochemical oxygen demand (BOD) and to clarify the effluent of particulates. In general, prior art treatment processes have not emphasized the removal of nitrogen-based and phosphorous-based nutrients from the clarified effluent. When the nutrient-rich effluent enters rivers, lakes and streams, water plant growth can be profuse, depleting the water of oxygen below levels needed to sustain desirable populations of fish and other aquatic life. Moreover, typical wastewater treatment reduces alkalinity when ammonia is oxidized to nitrate during aeration. Alkalinity is consumed and carbonic acid produced thereby lowering the pH of the effluent. As a result of these prior art processes, eutrophication of rivers, lakes and streams by the nutrient-rich effluent has become a major concern.

Prior art techniques for removing nitrogen and phosphorous compounds from wastewater have either been ineffective or too expensive. For example, effective wastewater denitrification requires nitrification of ammonia in an oxic environment followed by reduction of nitrate in an anoxic environment. Some prior art techniques have allowed contamination from one process to another and others have not maintained the required conditions long enough for effective treatment. Another prior art process uses methanol as a food source during denitrification. The methanol addition can be expensive and further requires subsequent processing to remove residual methanol. Other prior art techniques for the removal of phosphorous use chemical precipitation which is also an expensive process.

SUMMARY OF THE INVENTION

The wastewater treatment system of the present invention solves the prior art problems discussed above and provides a distinct advance in the state of the art. More particularly, the system hereof effectively removes nitrogen-based and phosphorous-based nutrients from wastewater treatment effluent using economical biological techniques.

In the preferred method, an influent of wastewater containing biosolids and ammonia is received into an anoxic tank where the wastewater is mixed with return activated sludge under substantially anoxic conditions. The wastewater is then received into an oxic tank where the wastewater is aerated in the presence of nitrifying organisms with sufficient aeration and for a time long enough for the nitrifying organisms to convert the ammonia to nitrate.

Next, the wastewater is delivered to a sequential aeration tank for denitrification where the wastewater is subjected to alternating quiescent and agitating steps in the presence of denitrifying and luxury uptake organisms. In the quiescent step, the wastewater is unagitated thereby allowing the biosolids and organisms to settle with the quiescent period being long enough to create substantially anoxic conditions whereby the wastewater and organisms become oxygen deprived and the organisms substantially cease taking up phosphorous for metabolism.

In the agitating step, aeration is used to agitate the wastewater which disperses the biosolids and denitrifying organisms. Because of the oxygen deprivation of the organisms and the lack of dissolved oxygen, the organisms reduce nitrates to nitrogen gas. The organisms also begin to metabolize and in so doing take up phosphorous from the wastewater. The quiescent and agitating steps are repeated for a plurality of cycles in order to reduce the levels of nitrates and phosphorous compounds. The wastewater is then clarified with the clarified effluent being substantially free of nitrogen-based and phosphorous-based nutrients, with a portion of the sludge being returned to the anoxic tank.

In preferred forms, the wastewater stream is split into two separate tanks for denitrification. While one tank is undergoing a quiescent step, the other tank is undergoing the agitating step. This allows the use of common aeration equipment with valves alternating the airflow between tanks. Other preferred aspects of the present invention are discussed further herein.

BRIEF DESCRIPTION OF THE DRAWINGS

FIG. 1 is a schematic block diagram illustrating the preferred apparatus and general wastewater flow of the present invention;

FIG. 2 is a plan view of the preferred embodiment of the apparatus of the present invention;

FIG. 5 is a perspective view of the discharge end of one of the sequential aeration tanks of the apparatus of FIG. 2 with portions cut away for clarity;

FIG. 6 is partial perspective view of a portion of one of the sequential aeration tanks of FIG. 2 during a quiescent step; and FIG. 7 is a partial perspective view of one of the sequential aeration tanks of FIG. 2 during an agitation and aeration step.

DETAILED DESCRIPTION OF THE PREFERRED EMBODIMENT

Figure 3:
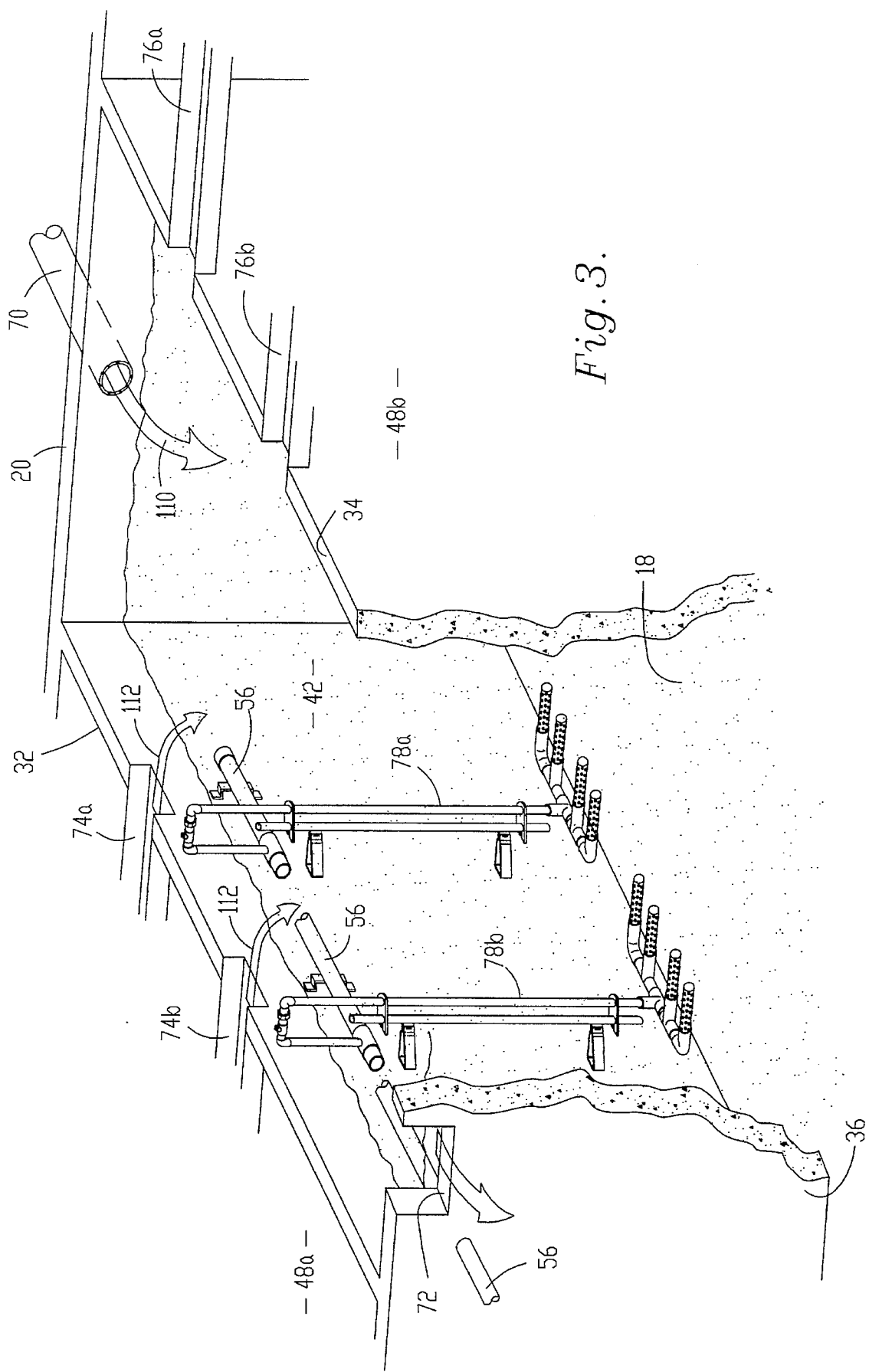
FIG. 3 is a perspective view of the preferred anoxic tank of FIG. 2 with portions cut away for clarity of illustration.

The drawing figures illustrate preferred wastewater treatment apparatus 10 of the present invention which broadly includes tank structure 12, air system 14 and biosolids loading equipment 16. Referring to FIG. 2, tank structure 12 includes concrete base 18 and a plurality of upright concrete walls defining various wastewater treatment basins or tanks.

These walls include exterior walls 20, 22, 24 and 26, Z-shaped interior walls 28, 30 and interior walls 32, 34, 36, 38 and 40 defining anoxic tank 42, oxic tank 44, sequential aeration tanks 46a and 46b, clarifiers 48a and 48b, biosolids settling tank 50, and biosolids loading tank 52. Tanks 42–52 present generally rectangular shapes with open tops to form liquid treatment basins with depths of about 12–20 feet.

Air system 14 is conventional in nature and includes a plurality of air blowers 54 providing air for aeration and agitation. Blowers 54 are coupled with piping 56, pipe run 58 by way of valve 60, pipe run 62 by way of valve 64 and pipe run 66 by way of valve 68.

Figure 4:
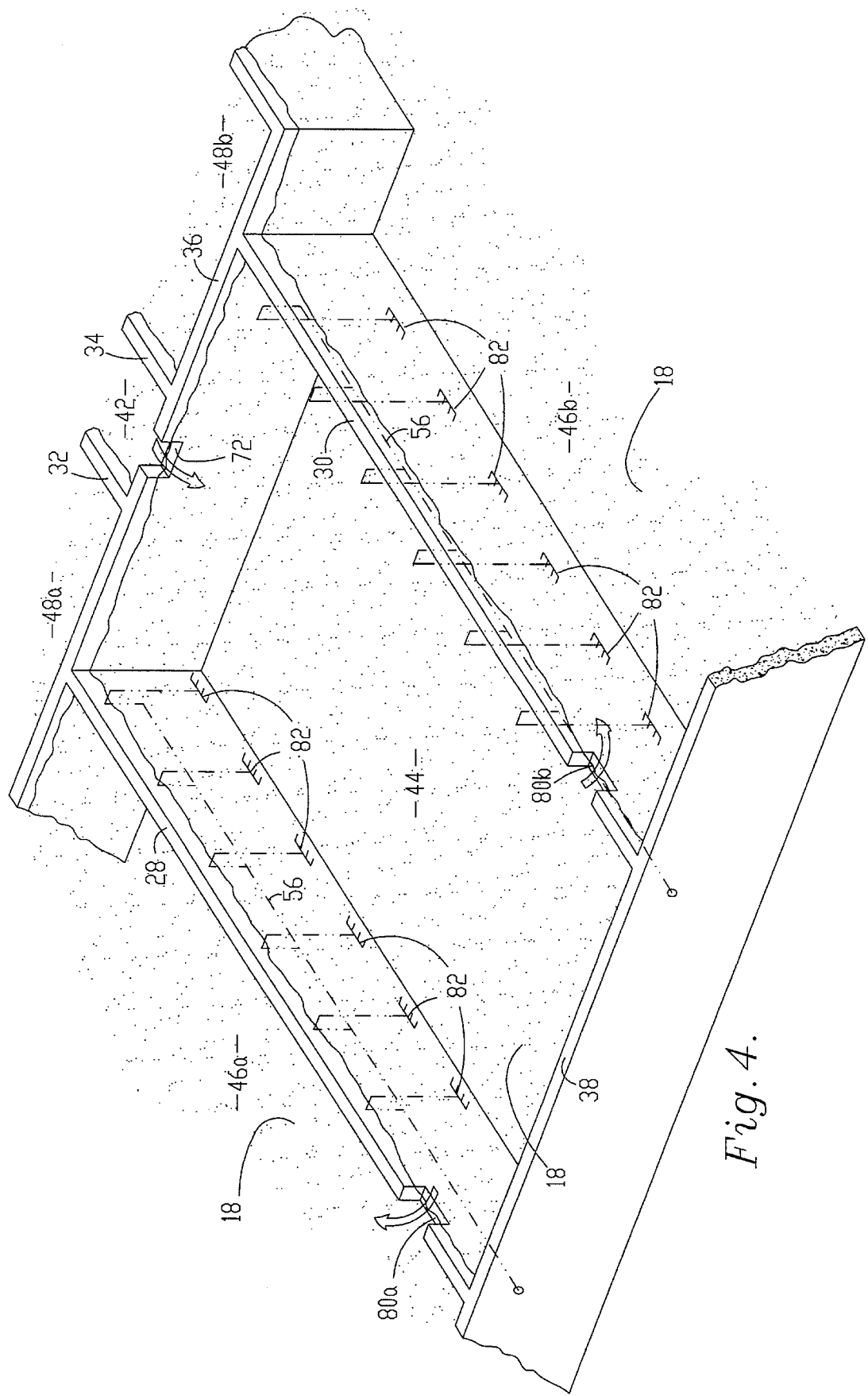
FIG. 4 is a perspective view of the preferred oxic tank of FIG. 2.

Anoxic tank 42, also known as a selector tank, is defined by side walls 32 and 34 and end walls 20 and 36. Inlet pipe 70 (FIG. 3) is positioned through end wall 20 just above the water line for receiving wastewater such as raw sewage as influent. Outlet notch 72 (FIGS. 3 and 4) is defined in the top of end wall 36 for transferring wastewater to oxic tank 44. Stainless steel troughs 74a and 74b extend through the top of sidewall 32 for receiving return activated sludge (RAS) from clarifier 48a, and troughs 76a and 76b extend through the top of sidewall 34 for receiving return activated sludge from clarifier 48b.

Tank 42 also includes air sparging agitators 78a and 78b positioned adjacent sidewall 32 and connected to piping 56 for receiving air from blowers 54. Even though agitators use air for agitating the contents of tank 42, the amount of air discharged is low enough to accomplish mixing without altering the anoxic environment therein such as that described in U.S. Pat. No. 5,421,383, incorporated herein by reference.

Oxic tank 44, also known as a nitrifying tank, is defined by walls 28, 30, 36 and 38 and receives wastewater from anoxic tank 42 by way of notch 72. Outlet notches 80a and 80b are defined in the tops of respective sidewalls 28, 30 adjacent end wall 38 to supply sequential aeration tanks 46a,b with substantially equal quantities of wastewater.

Oxic tank 44 includes a plurality of agitating aerators 82 distributed along the respective lengths of sidewalls 28, 30 and coupled with piping 56 for receiving air from blowers 54. Tank 44 also includes a conventional air lift pump (not shown) for transferring wastewater from tank 44 to settling tank 50 as illustrated by arrow 84 in FIG. 2. Settling tank 50 supplies clarified return water to oxic tank 44 through a notch (not shown) defined in end wall 44 as represented by arrow 86 in FIG. 2.

Sequential aeration tanks 46a,b extend along the outboard sides of apparatus 10 and are identical except for being left-right reversed. Tank 46a is defined by walls 20, 38, 24, 28 and includes a plurality of agitating aerators 88 distributed along the length of inboard side wall 28 supplied with air through pipe run 58 by way of valve 60. Similarly, tank 46b is defined by walls 26, 30, 36 and 38 and also includes a plurality of agitating aerators 90 distributed along the length of inboard side wall 30 supplied with air through pipe run 62 by way of valve 64.

Each tank 46a,b also includes an outlet assembly 92, illustrated in FIG. 5 for tank 46b. Assembly 92 includes L-shaped outlet pipes 94a and 94b, stainless steel screens 96a and 96b, cross-connect pipe 98 intercoupling pipes 94a,b, auxiliary effluent pipe 100 connected with pipes 94a,b and 98, and valve 102 positioned in pipe 100. Valve 102 can be controlled either electrically or pneumatically. For tank 46b, the horizontal legs of outlet pipes 94a,b extend through inboard wall 30 about half way below the water line into clarifier 48b. For tank 46a, the horizontal legs extend through inboard wall 28. The upper ends of outlet pipe 94a,b terminate just below the water line and are coupled with screens 96a,b respectively. Auxiliary effluent pipe 100 extends through end wall 20.

Clarifier 48a is defined by walls 20, 32, 34 and 36 and clarifier 48b is defined by walls 20, 30, 34 and 36. Wastewater enters clarifiers 48a,b through outlet assemblies 74 and effluent is discharged by way of respective effluent pipes 104a and 104b. Troughs 74a,b return activated sludge from clarifier 48a to anoxic tank 42, and troughs 76a,b return activated sludge from clarifier 48b to anoxic tank 42. Each clarifier 48a,b includes clarifying equipment operable for separating and decanting clarified wastewater for discharge through pipes 104a,b, and for removing activated sludge using an air lift as described in U.S. Pat. No. 5,035,795, incorporated herein by reference.

Wastewater containing a high concentration of biosolids passes from settling tank 50 by way of pipe 106 and valve 108 to loading tank 52. Conventional loading equipment 16 removes and dewaters the biosolids from loading tank 52 for loading onto trucks or other transport for disposal.

FIG. 1 illustrates the general wastewater flow through apparatus 10. Wastewater influent and return activated sludge are mixed under anoxic conditions in tank 42. In this tank, the organic "luxury uptake" process begins for phosphorous removal. In oxic tank 44, the luxury uptake process continues and ammonia is converted to nitrate. In sequential aeration tanks 46a,b the wastewater is subjected to alternating quiescent and agitation steps under respective anoxic and oxic conditions respectively. During these steps, nitrate is reduced to free nitrogen gas which dissipates from the surface of the wastewater and a succession of luxury uptake cycles reduces the phosphorous levels in the water. Clarifier tanks 48a,b separate the wastewater into activated sludge which is returned to anoxic tank 42 and into a clarified effluent with substantially reduced levels of nitrogen-based and phosphorous-based nutrients.

In operation, anoxic tank 42 receives an influent 110 of incoming wastewater such as raw sewage through inlet pipe 70 and receives return activated sludge 112 from clarifiers 48a,b by way of troughs 74a,b and 76a,b. Influent 110 includes biosolids along with phosphorous compounds and nitrogen compounds, typically 90% ammonia or unstable organic compounds that readily transform to ammonia. The return activated sludge 112 presents a biosolids concentration of about 7000 mg/l and includes organisms for biologically converting the influent to clarified water low in biochemical oxygen demand (BOD) and low in nutrients.

Agitators 78a,b mix the influent 110 and return activated sludge 112. Tank 42 is configured to retain and mix the wastewater (represented by the stippling in FIG. 3) under anoxic conditions for from about 10–60 minutes (preferably for about 30 minutes in a system designed for a total retention time of about 24 hours). Mixed wastewater flows from anoxic tank 42 to oxic tank 44 by way of notch 72.

Wastewater entering oxic tank 44 (see FIGS. 2 and 4) through notch 72 leaves at the opposite end through notches 80a,b. Oxic tank 44 is configured for plug flow and to provide a retention time of from about 1–10 hours (preferably about 6 hours in a system designed for an overall retention time of about 24 hours). Aerators 82 continually agitate and aerate the wastewater as it travels along tank 84.

In tank 44, autotrophs belonging to the Nitrosomonas and Nitrobacter groups nitrify the wastewater by converting ammonia to nitrate. These organisms do not compete well with heterotrophic organisms for oxygen in the presence of plentiful organic material. Thus, the preferred environment for nitrification in tank 44 is one with excess oxygen and moderate organic material. A minimum of 0.5 mg/l of dissolved oxygen (DO) is required with the preferred level of 2.0 mg/l and with a preferred biosolids concentration of between about 2000 and 2500 mg/l, with a maximum of about 6000 mg/l.

The concentration of biosolids in tank 44 is controlled by the amount of biosolids delivered from tank 44 to settling tank 50 for disposal. It will be appreciated that the biosolids concentration in tank 44 determines the biosolids concentration in tanks 46a,b and clarifiers 48a,b.

After processing in oxic tank 44, the wastewater flow is delivered in substantially equal amounts by way of notches 80a,b to sequential aeration tanks 46a,b for denitrification, continuation of the luxury uptake cycle, and recovery of alkalinity and chemical energy in the presence of heterotrophic organisms. (See FIGS. 2 and 5–7). Each of tanks 46a,b is configured to provide a retention time of from about 4 to 36 hours, and from 4 to 10 sequential cycles with each cycle lasting from about 1 to 3 hours. Preferably, each of tanks 46a,b is configured to provide a retention time of about 10.5 hours or a system designed for total retention time of 24 hours. This represents 7 sequential cycles of about 1.5 hours each. In tanks 46a,b, the wastewater is subjected to cycles of alternating quiescent and agitating steps to create alternating anoxic and oxic conditions, with each step lasting about 45 minutes resulting in a cycle time of 1.5 hours. In the preferred embodiment, the average concentration of biosolids in tanks 46a,b ranges between about 3200 and 3800 mg/l respectively. That is, the configuration of tanks 46a,b and the resulting retention time produces a biosolids concentration between about 50 and 60% greater than the biosolids concentration in oxic tank 44.

The processing cycles in tanks 46a,b are achieved by repetitive opening and closing of valves 60 and 64, preferably on a 45 minute time schedule, with one of these valves being open when the other is closed. For example, to initiate the quiescent step in tank 46a, conventional control equipment closes valve 60 to stop the air flow to aerators 88. At the same time, the control equipment initiates the agitation step in tank 46b by opening valve 64 to provide air to aerators 90. After 45 minutes, valve 60 is opened to initiate an agitation step in tank 46a and valve 64 is closed to begin a quiescent step in tank 46b. This cycle is repetitive. By managing the air flow in this way, the air flow output is relatively constant from blowers 54 and eliminates the need to start and stop the blowers. This reduces wear on the air supply equipment while still achieving the sequential aeration in tanks 46a,b.

During a quiescent step as illustrated in FIG. 6, no air is being delivered to aerators 88, 90. Without air to the aerators, the wastewater is unagitated and the biosolids settle to the bottom of the tank to form a biomass phase with an overlying water phase containing nitrate. Both phases soon become anoxic and the organisms in the biomass stop metabolizing under these anaerobic conditions, and release phosphorous instead of taking up phosphorous. The organisms also become oxygen deprived.

When the quiescent step ends and the agitation step begins (see FIG. 7), air is delivered to aerators 88, 90 which agitates the biomass and disperses it throughout the wastewater. However, before the biomass becomes dispersed, the phosphorous released by the organisms during the quiescent step is rapidly taken up again when aeration begins. Thus, the released phosphorous never contaminates the wastewater above the biomass that settles during the quiescent step. During the first few minutes, dissolved oxygen is not yet available in the water. As a result, the oxygen-deprived organisms are still in an anoxic environment and use the nitrate in the surrounding water as a final electron acceptor, producing free nitrogen gas as a byproduct. The gas dissipates from the surface of the wastewater and is thereby removed from the wastewater stream.

This denitrification process also reclaims some of the alkalinity consumed during the nitrification step in oxic tank 44. The oxidation reaction of converting ammonia to nitrate consumes almost seven grams of alkalinity, usually calcium carbonate, for one gram of ammonia oxidized to nitrate. However, the denitrification process produces about 3.5 grams of alkalinity for each gram of nitrate reduced to nitrogen gas. Some chemical energy is also recovered because the oxygen recovered from the nitrate is oxygen that does not have to be provided by aeration.

As the agitation step continues, and the dissolved oxygen level increases, the organisms experience an increased rate of metabolism and an increased need for phosphorous which is taken up from the wastewater. After a period of anaerobic conditions, the organisms take up more phosphorous than the minimum needed for metabolism. This phenomenon, known as the luxury uptake mechanism, results in a net decrease of phosphorous in the wastewater. During the balance of the agitation step, the organisms continue to degrade the biosolids to reduce BOD.

In the preferred embodiment, the wastewater experiences seven cycles of the quiescent and agitation steps as the wastewater flows along tanks 46a,b. With each cycle, the nitrates and phosphorous are reduced in the wastewater as it travels along tanks 46a,b. By the time the wastewater exits to clarifiers 48a,b the nitrate and phosphorous levels are substantially reduced using biological processes without the expense of chemical additions. It will also be appreciated that the processes occurring in tanks 42, 44 and 46a,b are physically separate thereby minimizing cross contamination, which has been a problem in the prior art.

Tanks 46a,b receive a continuous input of wastewater from oxic tank 44 which results in a continuous output of wastewater to respective clarifiers 48a,b by way of outlet assemblies 92 through screens 96a,b and outlet pipes 94a,b. During a quiescent step, however, the overlying liquid phase is substantially clarified water and the clarified water adjacent outlet assemblies 92 presents substantially reduced nitrogen-based and phosphorous-based nutrients. This allows clarified effluent to be discharged through auxiliary effluent pipes 100 by opening valves 102 and bypassing clarifiers 48a,b, which is a particular advantage during high flow periods exceeding the design capacity of the system.

Clarifiers 48a,b receive wastewater from tanks 46a,b, and clarify the wastewater for discharge as effluent through pipes 104a,b. The biosolids separated by clarifiers 48a,b are returned as activated sludge to anoxic tank 42. As a result of the processes described above, the effluent from apparatus 10 presents substantially reduced levels of nitrogen-based and phosphorous-based nutrients.

As those skilled in the art will appreciate, the present invention encompasses many variations in the preferred embodiment described herein. For example, the sizes and the retention times of the tanks along with the biosolids concentration levels can be varied as needed for particular conditions.

Having thus described the preferred embodiment, the following is claimed as new and desired to be secured by Letters Patent:

1. A method of treating wastewater comprising the steps of:

(a) receiving an influent of wastewater containing biosolids and ammonia;

(b) aerating the wastewater in the presence of nitrifying organisms with sufficient aeration and for a time long enough for the nitrifying organisms to convert ammonia to nitrate;

(c) after step (b), reducing nitrate in the wastewater to nitrogen gas by subjecting the wastewater to alternating quiescent and agitating steps in the presence of denitrifying organisms, said quiescent step including the step of subjecting the wastewater to a quiescent period in which the wastewater is unagitated thereby allowing the biosolids and denitrifying organisms to settle with said quiescent period being long enough for the wastewater and denitrifying organisms to become oxygen deprived, said agitating step including the step of subjecting the oxygen deprived wastewater to an agitation period by agitating the wastewater in order to disperse the biosolids and denitrifying organisms for a time sufficient for the denitrifying organisms to reduce at least a portion of the nitrate to nitrogen gas;

(d) repeating step (c) a plurality of times for successive reductions of the nitrate to nitrogen gas; and (e) after step (d), clarifying the wastewater to produce a clarified effluent of substantially reduced levels of nitrogen-based nutrients and to produce activated sludge.

2. The method as set forth in claim 1, step (c) including the step of reducing the levels of phosphorous compounds in the wastewater by subjecting the wastewater to alternating quiescent and agitating steps in the presence of luxury uptake organisms, said quiescent step including the step of subjecting the wastewater to a quiescent period in which the wastewater is unagitated thereby allowing the biosolids and denitrifying organisms to settle with said quiescent period being long enough for the wastewater and luxury uptake organisms to become oxygen deprived and to cease taking up substantial amounts of phosphorous for metabolism, said agitating step including the step of subjecting the oxygen deprived wastewater to an agitation period by agitating and aerating the wastewater in order to disperse the biosolids and luxury uptake organisms for a time sufficient for the luxury uptake organisms to take up at least a portion of the phosphorous compounds in the wastewater.

3. The method as set forth in claim 1, step (b) including the step of aerating the wastewater sufficiently to produce dissolved oxygen greater than about 0.5 mg/l.

4. The method as set forth in claim 3, said dissolved oxygen being about 2.0 mg/l.

5. The method as set forth in claim 4, step (b) including the step of maintaining a biosolids concentration of between about 2000 and 2500 mg/l.

6. The method as set forth in claim 1 including the step of treating the wastewater in step (b) for about 25% of the treatment of time of steps (a)–(e).

7. The method as set forth in claim 1 including the step of treating the wastewater in step (b) for about six hours.

8. The method as set forth in claim 1, said agitating step including the step of using aeration for agitating the wastewater.

9. The method as set forth in claim 1 including the step of performing step (b) in a first tank and performing step (c) in a second tank separate from step (b).

10. The method as set forth in claim 1 including the step of maintaining a biosolids concentration in step (c) between about 3000 and 4000 mg/l.

11. The method as set forth in claim 1 including the step of maintaining the biosolids concentration in step (c) at a level between about 50 and 60% greater than the biosolids concentration in step (b).

12. The method as set forth in claim 1 including the step of treating the wastewater in steps (c) and (d) for between about 40% and 45% of the treatment time of steps (a)–(e).

13. The method as set forth in claim 1 including the step of performing said quiescent and agitating steps for equal time periods.

14. The method as set forth in claim 1 including the steps of performing steps (c) and (d) for about 10½ hours.

15. The method as set forth in claim 1 including the step of performing steps (c) and (d) in two separate tanks for respective portions of the wastewater.

16. The method as set forth in claim 15 including the step of performing one of said quiescent and agitating steps in one of said tanks while performing the other of said quiescent and agitating steps in the other of said tanks.

17. A method of treating wastewater comprising the steps of:

(a) receiving an influent of wastewater containing biosolids, ammonia and phosphorous compounds into a first tank and mixing activated sludge with the influent under substantially anoxic conditions;

(b) receiving the wastewater from said first tank into a second tank and continuously aerating the wastewater therein to produce dissolved oxygen at about 2.0 mg/l in the presence of nitrifying organisms while maintaining a biosolids concentration of between about 2000 and 2500 mg/l for a time sufficient for the nitrifying organisms to convert the ammonia to nitrate;

(c) receiving the wastewater from said second tank into a third tank and therein reducing the nitrate compounds in the wastewater to nitrogen gas and taking up phosphorous from the wastewater by subjecting the wastewater to alternating quiescent and agitating steps in the presence of denitrifying organisms and luxury uptake organisms while maintaining the biosolids concentration between about 3300 and 3800 mg/l, said quiescent step including the step of subjecting the wastewater to a quiescent period in which the wastewater is unagitated thereby allowing the biosolids to settle with said quiescent period being long enough for the wastewater and denitrifying organisms to become oxygen deprived and for the luxury uptake organisms to substantially cease using phosphorous for metabolism, said agitating step including the step of subjecting the oxygen deprived wastewater to an agitation period by agitating the wastewater using aeration in order to disperse the biosolids and denitrifying organisms for a time sufficient for the denitrifying organisms to reduce at least a portion of the nitrate compounds to nitrogen gas and for luxury uptake organisms to take up phosphorous from the wastewater;

(d) repeating step (c) a plurality of times; and (e) receiving the wastewater from said third tank into a fourth tank, clarifying the wastewater to produce a clarified effluent with reduced levels of nitrogen-based and phosphorous-based nutrients and to produce activated sludge, and recycling the activated sludge to said first tank.

18. The method of claim 17 including repeating step (c) a sufficient number of times to produce during the last quiescent step a layer of clarified effluent with reduced levels of nitrogen-based and phosphorous-based nutrients located above a layer of settled biosolids, including the step of discharging a portion of said clarified effluent from said third tank without said clarified effluent being received into said fourth tank.

* * * * *